United States Patent
Nakazato et al.

(10) Patent No.: US 9,858,670 B2
(45) Date of Patent: Jan. 2, 2018

(54) INFORMATION PROCESSING APPARATUS AND METHOD THEREOF

(71) Applicant: CANON KABUSHIKI KAISHA, Tokyo (JP)

(72) Inventors: Yusuke Nakazato, Tokyo (JP); Kazuhiko Kobayashi, Yokohama (JP); Chihiro Mitsubori, Yokosuka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/873,811

(22) Filed: Oct. 2, 2015

(65) Prior Publication Data

US 2016/0104314 A1     Apr. 14, 2016

(30) Foreign Application Priority Data

Oct. 8, 2014   (JP) .................................. 2014-207541

(51) Int. Cl.
*G06T 7/00*        (2017.01)
*G06T 17/00*       (2006.01)

(52) U.S. Cl.
CPC ............ *G06T 7/0051* (2013.01); *G06T 17/00* (2013.01)

(58) Field of Classification Search
CPC ......... G06T 7/0051; G06T 2207/10028; G06T 7/0044; G06T 17/00; G06T 2207/30252; G06K 9/00201; G06K 9/00791
See application file for complete search history.

(56) References Cited

U.S. PATENT DOCUMENTS

| 7,239,741 | B2  | 7/2007 | Hiwada |  |
|---|---|---|---|---|
| 2004/0131247 | A1* | 7/2004 | Hiwada | G06K 9/00288 382/154 |
| 2008/0226253 | A1* | 9/2008 | Steinberg | H04N 5/272 386/278 |
| 2013/0123983 | A1* | 5/2013 | Brog Rdh | B25J 9/162 700/254 |
| 2013/0170725 | A1* | 7/2013 | Kang | G06K 9/00362 382/131 |

(Continued)

OTHER PUBLICATIONS

Varady et al., "Reverse engineering of geometric models—an introduction", Computer-Aided Design 29.4, pp. 255-268, 1997.

(Continued)

*Primary Examiner* — Jingge Wu
(74) *Attorney, Agent, or Firm* — Carter, Deluca, Farrell & Schmidt, LLP

(57) ABSTRACT

A two-dimensional image obtained by capturing a scene including an object is obtained. Parameters indicating capturing position and capturing orientation of the two-dimensional image are obtained. A three-dimensional shape model representing a three-dimensional shape of the object is obtained. Two-dimensional geometrical features of the object are extracted from the two-dimensional image. Three-dimensional information with respect to a surface of the object close to each of the two-dimensional geometrical features is calculated from the three-dimensional shape model. Three-dimensional geometrical features in the three-dimensional shape model, corresponding to the two-dimensional geometrical features are calculated based on the two-dimensional geometrical features, the parameters, and the calculated three-dimensional information.

9 Claims, 8 Drawing Sheets

(56) References Cited

U.S. PATENT DOCUMENTS

| | | | | |
|---|---|---|---|---|
| 2014/0192045 A1* | 7/2014 | Hwang | ................... | G06T 17/00 345/419 |
| 2014/0286536 A1* | 9/2014 | Pettersson | ............ | G01C 15/002 382/106 |
| 2014/0320492 A1* | 10/2014 | Jiang | ....................... | G06T 9/001 345/420 |
| 2015/0138310 A1* | 5/2015 | Fan | .................... | G06K 9/00201 348/36 |
| 2016/0259993 A1* | 9/2016 | Ulbricht | ................ | G06T 7/0028 |

OTHER PUBLICATIONS

Tsai, "A Versatile Camera Calibration Technique for High-Accuracy 3D Machine Vision Metrology Using Off-the-Shelf TV Cameras and Lenses", IEEE Journal of Robotics and Automation, vol. RA-3, No. 4, pp. 323-344, Aug. 1987.

Uchiyama et al., "MR Platform: A Basic Body on Which Mixed Reality Applications Are Built", Proceedings of the 1st International Symposium on Mixed and Augmented Reality, pp. 246-253.

Iguchi et al., "Three-Dimensional Image Measurement", Shokodo, 1990, pp. 78-119.

Besl et al, "A method for registration of 3-D shapes", IEEE Transactions on Pattern Analysis and Machine Intelligence, vol. 14, No. 2, pp. 239-256, 1992.

Lorensen et al., "Marching cubes: A high resolution 3D surface construction algorithm", ACM Siggraph Computer Graphics, vol. 21, No. 4, pp. 163-169, 1987.

Mostafa et al., "Integrating shape from shading and range data using neural networks", Computer Vision and Image Processing Lab, IEEE Computer Society Conference, vol. 2, 1999, pp. 1-6.

Johnson et al., "Using Spin Images for Efficient Object Recognition in Cluttered 3D Scenes", IEEE Trans. on PAMI, vol. 21, No. 5, pp. 433-449, 1999.

Drummond et al., "Real-time tracking of complex structures within on-line camera calibration", Proc. The 10th British Machine Vision Conference (BMVC '99), Nottingham, UK, Sep. 1999, pp. 1-10.

Tateno et al., "A Model Fitting Method Using Intensity and Range Images for Bin-Picking Applications", IEICE Transactions on Information and Systems, vol. J94-D, No. 8, pp. 1410-1422, 2011.

Maruyama et al., "Model-based 3D Object Localization Using Occluding Contours", MIRU2009, pp. 1630-1637, 2009.

* cited by examiner

ABSTRACT

INFORMATION PROCESSING APPARATUS AND METHOD THEREOF

BACKGROUND OF THE INVENTION

Field of the Invention

The present invention relates to information processing of creating the three-dimensional shape model of an object.

Description of the Related Art

There is a reverse engineering technique of generating the three-dimensional shape model of an object from a range image obtained by measuring a plurality of positions and orientations of the object. Generally in shape reconstruction by reverse engineering, the position and orientation of an object are changed many times, and a distance measurement apparatus captures range images. Noise removal from the distance point groups of an enormous number of range images, and alignment between the respective range images (three-dimensional point groups) are performed, and a fine shape is reproduced by work such as surface generation (see literature 1).

Literature 1: Tamas Varady, Ralph R. Martin, Jordan Cox, "Reverse engineering of geometric models—an introduction", Computer-Aided Design 29.4, pp. 255-268, 1997

However, three-dimensional measurement of the edge portion of an object is difficult, and it is hard to generate a three-dimensional shape model with high reproduction accuracy of the object shape owing to the limitation of the shape measurement accuracy.

SUMMARY OF THE INVENTION

In one aspect, an information processing apparatus comprising: a first obtaining unit configured to obtain a two-dimensional image obtained by capturing a scene including an object; a second obtaining unit configured to obtain parameters indicating a capturing position and capturing orientation of the two-dimensional image; a third obtaining unit configured to obtain a three-dimensional shape model representing a three-dimensional shape of the object; an extraction unit configured to extract two-dimensional geometrical features of the object from the two-dimensional image; a first calculation unit configured to calculate, from the three-dimensional shape model, three-dimensional information with respect to a surface of the object close to each of the two-dimensional geometrical features; and a second calculation unit configured to calculate three-dimensional geometrical features in the three-dimensional shape model, corresponding to the two-dimensional geometrical features based on the two-dimensional geometrical features, the parameters, and the calculated three-dimensional information.

According to the aspect, a three-dimensional shape model with high reproduction accuracy of the object shape can be generated.

Further features of the present invention will become apparent from the following description of exemplary embodiments with reference to the attached drawings.

DESCRIPTION OF THE EMBODIMENTS

An information processing apparatus and information processing method according to embodiments of the present invention will now be described in detail with reference to the accompanying drawings. Note that the embodiments are not intended to limit the claims of the present invention, and not all the combinations of features described in the embodiments are necessarily essential to the solution of the present invention.

First Embodiment

[Outline]

In the first embodiment, a method of generating a high-accuracy three-dimensional shape model by using a three-dimensional shape model (to be referred to as a "referential three-dimensional shape model" hereinafter) including the shape error of an object (to be referred to as a "target object" hereinafter) serving as a three-dimensional model generation target, and a two-dimensional image obtained by capturing the target object will be explained. In the first embodiment, generation of a three-dimensional shape model under the following conditions will be explained:

- a referential three-dimensional shape model is a range image (three-dimensional point group) serving as a set of three-dimensional points obtained by three-dimensionally measuring a target object,
- a three-dimensional geometrical feature is a three-dimensional point on the edge of a target object shape, and a three-dimensional edge sampling point indicating the orientation of the edge, and
- a three-dimensional shape model to be generated is a set of three-dimensional edge sampling points.

Figure 1:
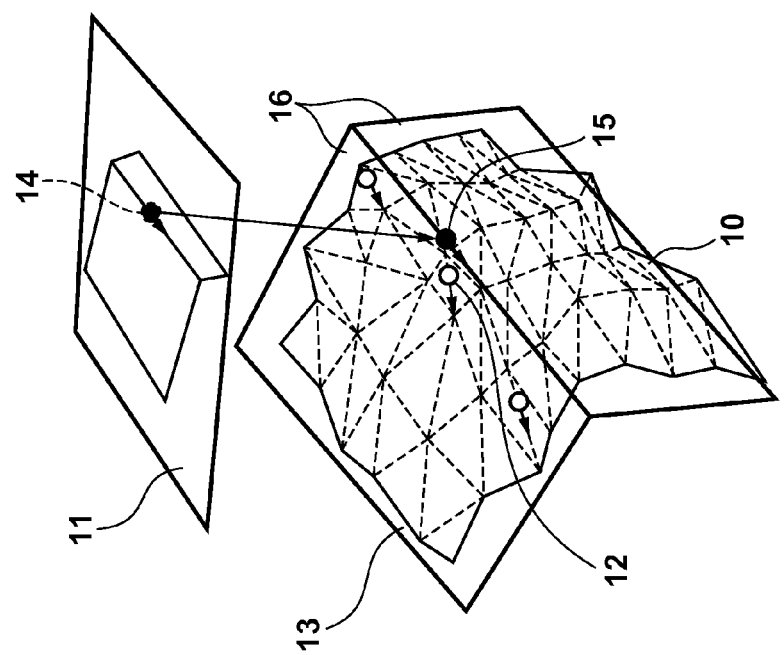
FIG. 1 is a view for explaining a three-dimensional shape model generation principle according to the first embodiment.

A three-dimensional shape model generation principle according to the first embodiment will be explained with reference to FIG. 1. FIG. 1 is an enlarged view showing the edge portion of a target object. A three-dimensional shape model (referential three-dimensional shape model) 10 generated using measurement data by a three-dimensional measurement apparatus of a non-contact method can reproduce a wide surface portion with high accuracy. However, three-dimensional measurement of an edge portion is difficult, so the accuracy of the edge portion of the referential three-dimensional shape model 10 readily decreases. When a three-dimensional point on the edge and a three-dimensional edge sampling point 12 indicating the orientation are extracted from the edge portion of the referential three-dimensional shape model 10, the position and orientation shift between the three-dimensional edge sampling point 12 and a correct three-dimensional edge sampling point 15 on a true shape 13 of the target object.

Since a visual luminance change is large at the edge portion, the edge portion of the target object is clearly observed in a two-dimensional image 11. Therefore, a two-dimensional edge sampling point 14 can be detected with high accuracy from the edge portion of the target object captured in the two-dimensional image 11. The edge portion is a boundary between adjacent surfaces. Assume that the edge portion of the target object exists on the edge of the two-dimensional image 11, and exists on surfaces adjacent to each other (adjacent surfaces 16) in the referential three-dimensional shape model 10. Three-dimensional geometrical information (three-dimensional edge sampling point) satisfying this assumption is calculated and registered in the three-dimensional shape model of the target object. Accordingly, the shape of the edge portion, for which three-dimensional measurement is difficult and it is hard to constitute a three-dimensional shape with high accuracy, can be generated with high accuracy.

Figure 2:
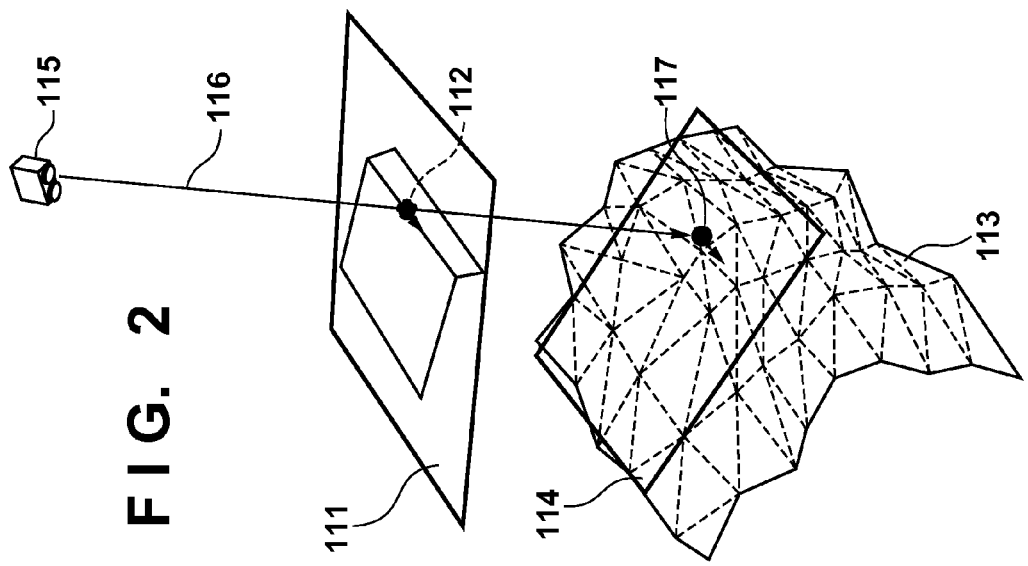
FIG. 2 is a view for explaining an outline of three-dimensional shape model generation processing.

An outline of three-dimensional shape model generation processing according to the first embodiment will be explained with reference to FIG. 2. In the first embodiment, the three-dimensional position and orientation of a two-dimensional edge sampling point extracted from a two-dimensional image are calculated as a three-dimensional edge sampling point. The two-dimensional edge sampling point is a two-dimensional point on an edge detected from the two-dimensional image, and has two-dimensional coordinates and orientation (two-dimensional) information on the image.

Based on the above-described assumption, a two-dimensional edge sampling point 112 on a two-dimensional image 111 is obtained, and a neighbor surface 114 near the two-dimensional edge sampling point 112 is obtained from a referential three-dimensional shape model 113. An intersection at which a straight line (a line 116 of sight) connecting the two-dimensional edge sampling point 112 and the capturing viewpoint (position of an image capturing device 115) of the two-dimensional image 111 crosses the neighbor surface 114 is set as a three-dimensional edge sampling point 117 corresponding to the two-dimensional edge sampling point 112. The direction of the three-dimensional edge sampling point 117 is calculated as an orientation that is orthogonal to the normal of the neighbor surface 114 and parallel to the orientation of the two-dimensional edge sampling point 112.

[Apparatus Arrangement]

Figure 3:
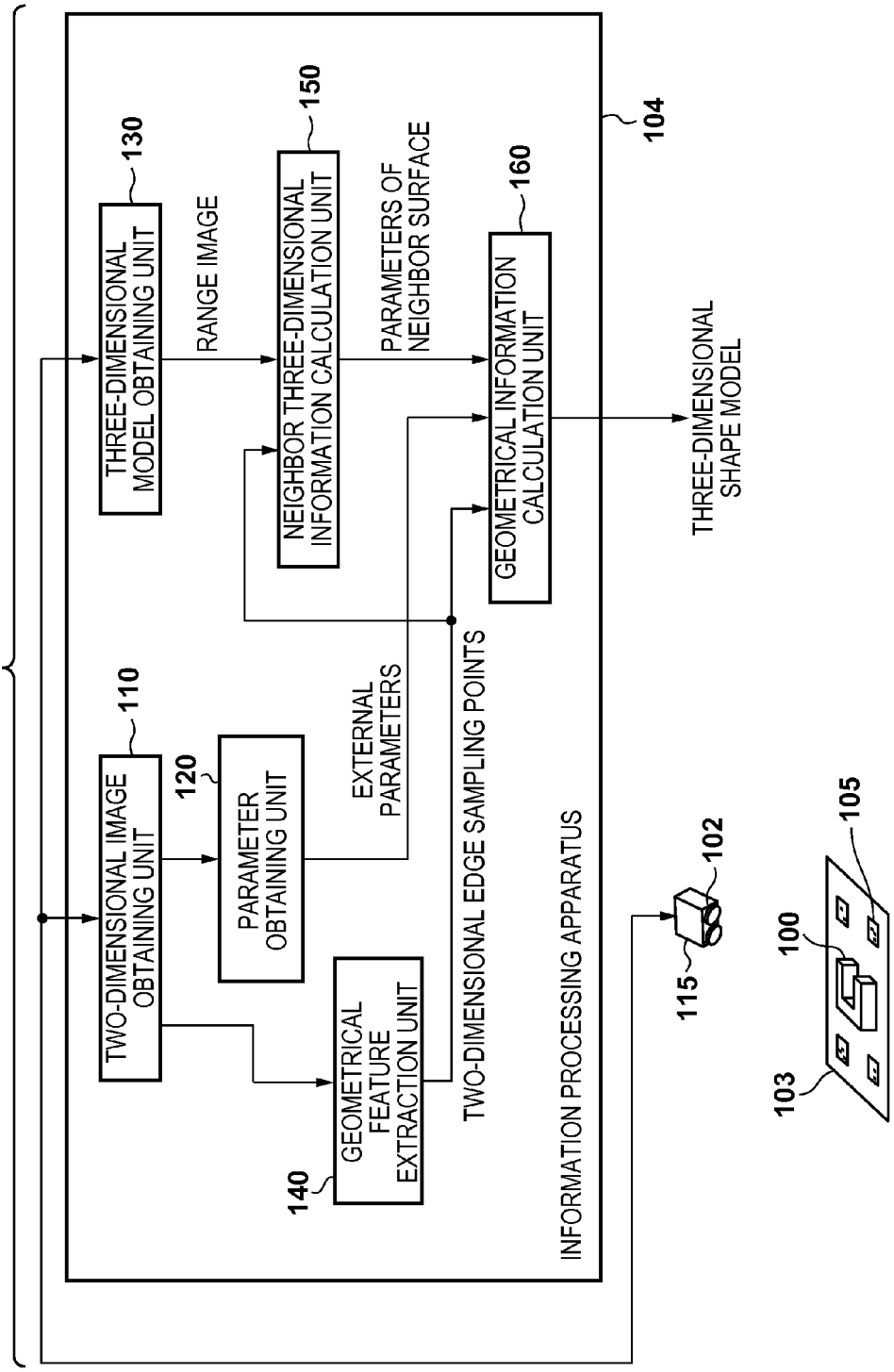
FIG. 3 is a block diagram showing the arrangement of an information processing apparatus.

The arrangement of an information processing apparatus 104 according to the first embodiment will be shown in the block diagram of FIG. 3. In the information processing apparatus 104, a two-dimensional image obtaining unit 110 obtains the two-dimensional image 111 of a scene including a target object 100 captured by the image capturing device 115. Note that the two-dimensional image 111 is a grayscale image in which a luminance value is stored in each pixel. As the image capturing device 115, a camera having an image sensor such as a CCD sensor or CMOS sensor is used.

At the time of capturing the target object 100, an indicator 105 such as a marker obtained by inscribing a pattern having a known position and shape on a flat surface, or a structure having a known shape is arranged in a workspace 103 around the target object 100, in order to obtain later the external parameters of the image capturing device 115 at the time of image capturing. Then, the target object 100 and the indicator 105 are captured altogether.

A parameter obtaining unit 120 obtains the internal parameters (for example, focal length and lens distortion parameter) of the image capturing device 115, and calculates external parameters in the two-dimensional image 111 obtained by the two-dimensional image obtaining unit 110. The internal parameters of the image capturing device 115 are calibrated using a technique described in the following literature 2 or the like by, for example, capturing a known pattern in advance. The external parameters represent the position and orientation (to be referred to as "capturing position and capturing orientation" hereinafter) of the image capturing device 115 or two-dimensional image 111 with respect to the target object 100. The external parameters are calculated using a technique described in literature 3 or the like from the two-dimensional image 111 obtained by capturing both the target object 100 and the indicator 105, and the internal parameters of the image capturing device 115.

Literature 2: Roger Y. Tsai, "A Versatile Camera Calibration Technique for High-Accuracy 3D Machine Vision Metrology Using Off-the-Shelf TV Cameras and Lenses", IEEE Journal of Robotics and Automation, Vol. RA-3, No. 4, pp. 323-344, August 1987

Literature 3: S. Uchiyama et al., "MR Platform: A Basic Body on Which Mixed Reality Applications Are Built", Proceedings of the 1st International Symposium on Mixed and Augmented Reality, pp. 246-253

A three-dimensional model obtaining unit 130 obtains a range image as the referential three-dimensional shape model 113 representing the three-dimensional shape of the target object 100. In obtaining the range image, for example, a projection device 102 projects structural pattern light to the target object 100. The pattern is decoded from an image obtained by capturing the pattern light by the image capturing device 115, the projection position of the projection device 102 is specified, and the distance is calculated by triangulation from the positional relationship between image capturing and projection (see literature 4).

Literature 4: Iguchi, Sato, "Three-Dimensional Image Measurement", Shokodo, 1990

Needless to say, the image capturing device 115 used by the two-dimensional image obtaining unit 110 can be shared as the image capturing device 115 used by the three-dimensional model obtaining unit 130, by projecting pattern-less light from the projection device 102, or obtaining the two-dimensional image 111 without performing projection. Hence, the same coordinate system is set for the two-dimensional image 111 and the range image.

A geometrical feature extraction unit 140 extracts, as a two-dimensional geometrical feature of the target object 100, the two-dimensional edge sampling point 112 from the edge portion of the target object 100 captured in the two-dimensional image 111. A neighbor three-dimensional information calculation unit 150 calculates, as neighbor three-dimensional information, the parameters of the neighbor surface 114 near the two-dimensional edge sampling point 112 extracted by the geometrical feature extraction unit 140 from the range image (three-dimensional information) obtained by the three-dimensional model obtaining unit 130.

The parameters of the neighbor surface 114 are approximated by a plane, and indicate the parameters of a plane equation, that is, the normal of a surface and a distance from the origin. The neighbor three-dimensional information calculation unit 150 samples, from the range image, a pixel group near a three-dimensional point corresponding to the two-dimensional edge sampling point 112. The equation of a three-dimensional plane is applied to a three-dimensional point group equivalent to the sampled pixel group, and the parameters of the plane equation are calculated as the parameters of the neighbor surface 114.

A geometrical information calculation unit 160 calculates three-dimensional information (position and direction) of the three-dimensional edge sampling point 117 from the external parameters, the two-dimensional information (coordinates and orientation) of the two-dimensional edge sampling point 112, and the parameters of the neighbor surface 114. Based on the above-described assumption, the geometrical information calculation unit 160 calculates, as the three-dimensional edge sampling point 117, an intersection at which the straight line (the line 116 of sight) connecting the capturing position of the two-dimensional image 111 represented by the external parameter and the two-dimensional edge sampling point 112 crosses the neighbor surface 114. The direction of the three-dimensional edge sampling point 117 is calculated as an orientation that is orthogonal to the normal of the neighbor surface 114 and parallel to the orientation of the two-dimensional edge sampling point 112.

[Generation of Three-Dimensional Shape Model]

Figure 4:
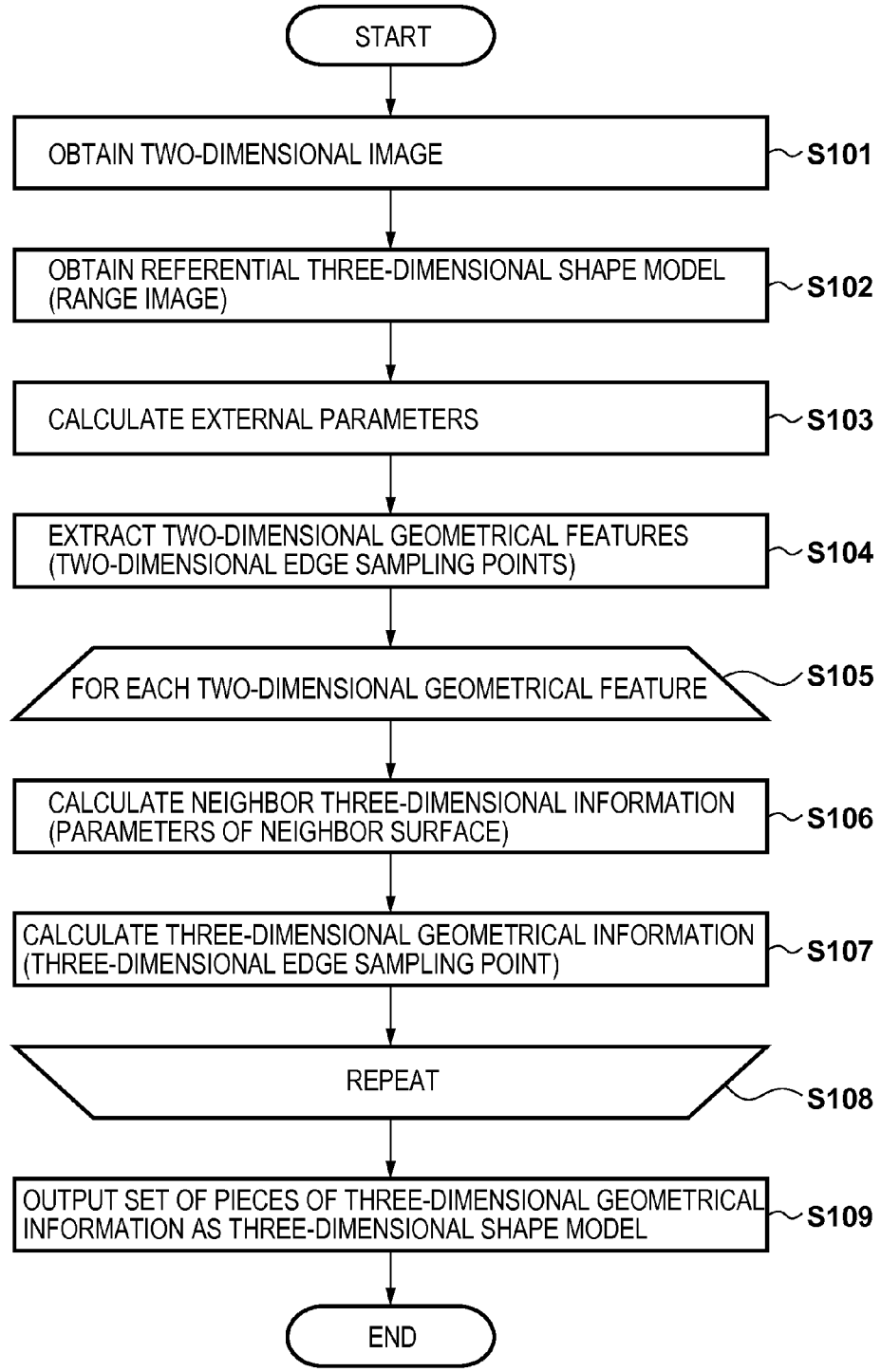
FIG. 4 is a flowchart for explaining three-dimensional shape model generation processing.

Three-dimensional shape model generation processing by the information processing apparatus 104 according to the first embodiment will be explained with reference to the flowchart of FIG. 4. Note that the internal parameters (for example, focal length and lens distortion parameter) of the image capturing device 115 are explained to have already been obtained in advance by the parameter obtaining unit 120.

The two-dimensional image obtaining unit 110 obtains the two-dimensional image 111 of a scene including the target object 100 (S101). The three-dimensional model obtaining unit 130 obtains, as the referential three-dimensional shape model 113, a range image representing the three-dimensional shape of the target object 100 (S102).

Then, the parameter obtaining unit 120 calculates external parameters (capturing position and capturing orientation) from the internal parameters of the image capturing device 115 that have been obtained in advance, and the two-dimensional image 111 obtained by the two-dimensional image obtaining unit 110 (S103). The external parameters (capturing position and capturing orientation) are calculated based on the coordinates of the indicator 105 on the two-dimensional image 111 in which a distortion has been corrected by inverse transformation based on the internal parameters, and the three-dimensional coordinates of the indicator 105.

The geometrical feature extraction unit 140 extracts the two-dimensional edge sampling points 112 as two-dimensional geometrical features from the two-dimensional image 111 (S104). For example, a Canny operator is applied to the two-dimensional image 111 to generate an edge detection image, a two-dimensional edge sampling point is sampled for every pixel from the edge detection image, and the coordinates (two dimensions) and orientation (two dimensions) of the two-dimensional edge sampling point 112 are extracted by one or more.

Subsequently, in steps S105 to S108, the position and orientation of the three-dimensional edge sampling point 117 are calculated for each two-dimensional edge sampling point 112 extracted as a two-dimensional geometrical feature. Although processing on one two-dimensional edge sampling point 112 will be explained below, the same processing is performed on the remaining two-dimensional edge sampling points 112.

The neighbor three-dimensional information calculation unit 150 calculates, from the range image (referential three-dimensional shape model 113), the parameters of the neighbor surface 114 adjacent to the two-dimensional edge sampling point 112 (S106). The range image serving as the referential three-dimensional shape model 113 has the two-dimensional coordinates of three-dimensional points measured in the same two-dimensional matrix as that of the two-dimensional image 111. By obtaining values stored at the same two-dimensional coordinates, the correspondence between the two-dimensional image and the range image can be uniquely obtained.

From this, the neighbor three-dimensional information calculation unit 150 samples a pixel group on the range image from a two-dimensional region adjacent to the two-dimensional edge sampling point 112, and samples a three-dimensional point group equivalent to the pixel group. Then, plane fitting is performed on the three-dimensional point group, and the parameters of the neighbor surface 114 are calculated. To perform plane fitting, it is desirable to sample a continuous surface in a range as wide as possible. Thus, the sampling region is gradually expanded, the region expansion is stopped at a point where the error of plane fitting becomes large, and a plane at that time is set as the neighbor surface 114. More specifically, the parameters of the neighbor surface 114 are calculated by the following procedures:

Step R1: three-dimensional points on the surface of the referential three-dimensional shape model 113 are sampled from a circular region adjacent to the two-dimensional edge sampling point 112, Step R2: plane fitting is performed on the sampled three-dimensional point group to calculate a plane parameter, Step R3: the variance value of the error of plane fitting is calculated and compared with a predetermined threshold, Step R4: if the variance value of the error of plane fitting is equal to or smaller than the predetermined threshold, the circular region is expanded, and the process is returned to step R2, and Step R5: if the variance value of the error of plane fitting exceeds the predetermined threshold, the plane parameter calculated in immediately preceding step R2 is set as the parameter of the neighbor surface 114.

Step R1: The edge portion of the target object 100 is assumed to be a boundary between two surfaces, and three-dimensional points on the surface of the referential three-dimensional shape model 113 are sampled respectively on the two sides of the two-dimensional edge sampling point 112, that is, in two directions orthogonal to the direction of the two-dimensional edge sampling point 112. The sampling region is a circular region of a radius r (scalar) from a center coordinate point b (two-dimensional vector). Three-dimensional points in the circular region of the radius r from the center coordinate point b are sampled:

$$\vec{b} = \vec{q} \pm r(\vec{q} \times \vec{t}) \qquad (1)$$

where $\vec{b}$ is the center coordinate point (two-dimensional vector) of the sampling region, $\vec{q}$ is the two-dimensional coordinate point (two-dimensional vector) of the two-dimensional edge sampling point 112, $\vec{t}$ is the direction vector (two-dimensional vector) of the two-dimensional edge sampling point 112, r is the radius (scalar; the initial is one pixel) of the circular region, and "x" is the outer product, and the following "." is the inner product.

Step R2: Plane fitting by the least squares method is performed on the three-dimensional point group obtained in step R1, and a plane parameter is calculated. Step R3: The variance value of the error of plane fitting in step R2 is calculated and compared with a predetermined threshold. Step R4: If the variance value of the error of plane fitting is equal to or smaller than the predetermined threshold, the radius r of the circular region is increased by only Δr, and the process is returned to the processing in step R1. Note that the increment Δr is, for example, one pixel. If the variance value of the error of plane fitting is larger than the predetermined threshold, the plane parameter calculated in immediately preceding step R2 is set as the parameter of the neighbor surface 114.

After that, the geometrical information calculation unit 160 calculates three-dimensional information (position and direction) of the three-dimensional edge sampling point 117 from the external parameters, the two-dimensional information (coordinates and orientation) of the two-dimensional edge sampling point 112, and the parameters of the neighbor surface 114 (S107). A position p' of the three-dimensional edge sampling point 117 is defined on the straight line (the line 116 of sight) connecting a two-dimensional edge sampling point m and the capturing position 115, and is given by:

$$p'=km \quad (2)$$

where p' is the position (three-dimensional vector) of the three-dimensional edge sampling point 117, m is the three-dimensional coordinates ($m=(u, v, 1)^T$) of the two-dimensional edge sampling point 112, and k is the coefficient (scalar).

An assumption that the position p' of the three-dimensional edge sampling point 117 exists on the neighbor surface 114 is introduced:

$$p'\cdot n - h = 0 \quad (3)$$

where n is the normal direction (three-dimensional vector) of the neighbor surface 114, and h is the distance (scalar) from the origin to the neighbor surface 114.

From equations (2) and (3), the coefficient k is given by:

$$k = h/(m\cdot n) \quad (4)$$

From equations (2) and (4), the position p' is given by:

$$p' = \{h/(m\cdot n)\}m \quad (5)$$

An orientation s (three-dimensional vector) of the three-dimensional edge sampling point 117 is orthogonal to the normal direction of a plane defined by the line 116 of sight and the direction of the two-dimensional edge sampling point 112 in the three-dimensional space, is orthogonal to a normal direction n of the neighbor surface 114, and can be given by:

$$s = \{(\lambda \times m) \times n\}/\|\{(\lambda \times m) \times n\}\| \quad (6)$$

where λ is the direction ($\lambda=(\lambda u, \lambda v, 0)^T$) of the two-dimensional edge sampling point 112, and ∥x∥ is the length (scalar) of the vector x.

If there is no hide, two regions where a three-dimensional point group is sampled exist with respect to the two-dimensional edge sampling point 112 serving as the center. Therefore, a maximum of two neighbor surfaces 114 are calculated, and two three-dimensional edge sampling points are calculated. Of these two three-dimensional edge sampling points, one having a smaller error of plane fitting of the three-dimensional point group to the neighbor surface 114 is set as the position and orientation of the three-dimensional edge sampling point 117.

Thereafter, it is determined whether calculation processing of the positions and orientations of the three-dimensional edge sampling points 117 corresponding to all the extracted two-dimensional edge sampling points 112 has ended (S108). If the calculation processing has ended, a set of the three-dimensional edge sampling points 117 is output as a three-dimensional shape model (S109), and the three-dimensional shape model generation processing ends.

In this manner, the three-dimensional shape of an edge portion, for which three-dimensional measurement is difficult and it is hard to constitute a three-dimensional shape with high accuracy, can be calculated with high accuracy, and the high-accuracy three-dimensional shape model of the target object 100 can be generated.

Modification of Embodiment

The geometrical feature extraction unit 140 suffices to extract a two-dimensional geometrical feature from a two-dimensional image, and may use an image feature such as Harris or SIFT (Scale-Invariant Feature Transform), in addition to a two-dimensional edge sampling point. In this case, a high-accuracy three-dimensional shape model can be generated even for a target object having a texture. When an image feature such as Harris or SIFT is used, the neighbor three-dimensional information calculation unit 150 may calculate a neighbor surface from a neighbor region centered on the image feature.

After the processing in step S108, calculated three-dimensional geometrical information may be added to a referential three-dimensional shape model to reconstruct a three-dimensional shape model. For example, if the referential three-dimensional shape model is a range image (three-dimensional point group), the three-dimensional coordinates of the calculated three-dimensional geometrical information are added as a three-dimensional point to the referential three-dimensional shape model. If the referential three-dimensional shape model is a three-dimensional shape model having surface information such as a mesh model, the three-dimensional coordinates of the calculated three-dimensional geometrical information are added as a three-dimensional point to the referential three-dimensional shape model, and surface information is calculated again.

It is also possible to set the reconstructed three-dimensional shape model as a referential three-dimensional shape model and repetitively perform the above-described processes (steps S105 to S108). To calculate three-dimensional geometrical information based on the high-accuracy three-dimensional shape model, the reproduction accuracy of the three-dimensional shape of the target object 100 can be further improved.

The arrangement of the two-dimensional image obtaining unit 110 is arbitrary as long as a two-dimensional image can be obtained. That is, a grayscale image may be obtained, or a color image using color filters of, for example, three colors may be obtained. A two-dimensional image may be obtained using an infrared or ultraviolet ray other than visible light, or fluorescence or the like may be observed. Note that the format and image size of a two-dimensional image can be set in accordance with the measurement system, and the two-dimensional image supply source is not limited to the image capturing device 115, and a two-dimensional image captured in advance may be read out from a storage device. As a matter of course, a plurality of image capturing devices may be used.

The arrangement of the three-dimensional model obtaining unit 130 is arbitrary as long as data representing the three-dimensional surface shape of a target object, other than the range image, can be obtained. The range image holds a distance value up to the surface of a target object observed from a specific viewpoint, or three-dimensional coordinates, and has an image shape of a two-dimensional matrix, a list shape, or the like. The range image may not use a two-dimensional matrix equal in size to a two-dimensional image. The correspondence between a two-dimensional image and a three-dimensional point can be obtained by transforming the three-dimensional point coordinates of the range image into two-dimensional coordinates using the internal parameters of the image capturing device 115:

$$(u,v)^T = (f \cdot x/z, f \cdot y/z)^T \qquad (7)$$

where (u, v) are the coordinates on the two-dimensional image, (x, y, z) are three-dimensional coordinates, and f is the focal length (internal parameter).

Equation (7) is an equation of projecting (perspective projection transformation) three-dimensional coordinates (x, y, z) to coordinates (u, v) on a two-dimensional image when the focal length serving of the internal parameter is f.

The same image capturing device as that of the two-dimensional image obtaining unit 110 need not be used to obtain a range image. The projection device may be a projector, or a device in which a mask pattern is arranged in front of a light source. The projection device is arbitrary as long as a structural pattern can be projected. Further, the range image obtaining method is not limited to a method using the projection device and the image capturing device, and may use a stereo camera that calibrates in advance the relative positions and orientations of two or more cameras and uses them. Further, the following methods are proposed as the range image obtaining method:

a method of performing irradiation with random dots, calculating the local correlation coefficient of an image, performing association based on the correlation strength, and calculating a distance by triangulation from stereo parameters, a Time Of Fright (TOF) range image obtaining method of measuring the time until light is reflected and returned after emission, a method of obtaining a range image by measuring a laser reflection position using a line laser when a target object is moved linearly, and converting the laser reflection position into a three-dimensional position, a method of obtaining a three-dimensional point group by using a coordinate-measuring machine (CMM) of a contact method or the like.

The referential three-dimensional shape model may be a mesh model serving as a set of pieces of connection information between a three-dimensional point group and three-dimensional points representing a local plane. As for the mesh model, a target object is measured from at least one viewpoint by a three-dimensional measurement apparatus that measures a range image or a three-dimensional point group. The measured three-dimensional point group is aligned by a technique described in literature 5 or the like. Then, a surface is generated using a technique described in literature 6 or the like, and a mesh model can therefore be created. Alignment is to calculate relative positions and orientations between measurement data, obtain position and orientation parameters to be transformed into one coordinate system, and integrate measurement data.

Literature 5: P. J. Besl, N. D. McKay, "A method for registration of 3-D shapes", IEEE Transactions on Pattern Analysis and Machine Intelligence, Vol. 14, No. 2, pp. 239-256, 1992

Literature 6: William E. Lorensen, Harvey E. Cline, "Marching cubes: A high resolution 3D surface construction algorithm", ACM Siggraph Computer Graphics, Vol. 21, No. 4, pp. 163-169, 1987

A three-dimensional shape model may be generated from a plurality of two-dimensional images captured from different viewpoints by using a technique such as Structure from X-ray. The three-dimensional shape model may take any representation form as long as it represents a three-dimensional surface shape, such as an implicit polynomial model representing a three-dimensional shape by one or more implicit polynomials, an analytic curved surface model represented by an analytic curved surface, or a voxel model represented by a three-dimensional matrix, in addition to the mesh model. Further, it is also possible to obtain a range image or a three-dimensional model in advance, record it in a storage device, read it out from the storage device, and use it.

The parameter obtaining unit 120 is arbitrary as long as internal parameters (for example, focal length and lens distortion parameter) and external parameters (capturing position and capturing orientation) corresponding to a two-dimensional image can be obtained. An indicator having a known position and shape may be captured to calculate external parameters by a well-known technique, or internal parameters may be read out from the storage device. Internal parameters described in ExIF information of a two-dimensional image may be used.

External parameters may be calculated from a plurality of two-dimensional images by using a range imaging technique such as Structure from Motion, or a tracking technique such as Visual SLAM. At the same time, internal parameters may be calculated. A sensor or indicator for measuring a capturing position and capturing orientation may be attached to the image capturing device to obtain external parameters from external sensor information. The image capturing device may be installed in an apparatus such as a robot, and external parameters may be calculated based on the position and orientation of an apparatus such as a robot.

When creating a referential three-dimensional shape model from a plurality of measurement data, an image capturing device capable of simultaneously capturing a range image and a two-dimensional image may be used, and a capturing position and capturing orientation obtained as a result of alignment between range images (three-dimensional point groups) may be set as external parameters of a two-dimensional image corresponding to each range image. At this time, even when the two-dimensional image and the range image cannot be captured from the same viewpoint, if their relative positions and orientations are known, the capturing position and capturing orientation of the two-dimensional image can be calculated from the capturing position and capturing orientation of the range image. When there are a plurality of image capturing devices, it is also possible to stationarily install the respective image capturing devices, calibrate their positions and orientations in advance by the above-mentioned method, save them in a storage device, and read them out from the storage device.

The geometrical feature extraction unit 140 suffices to be able to extract a two-dimensional geometrical feature from a two-dimensional image. The two-dimensional geometrical feature is a graphical feature included in the image capturing region of a target object included in a two-dimensional image, and is an image feature such as a two-dimensional edge or corner. The two-dimensional feature extraction interval is not limited to every pixel. The extraction interval and extraction density may be determined in accordance with the size of a target object, the characteristics of the image capturing device, and the like, and an extraction interval and extraction density corresponding to a user instruction may be set.

The neighbor three-dimensional information calculation unit 150 suffices to be able to calculate neighbor three-dimensional information representing surface information near a two-dimensional geometrical feature from a referential three-dimensional shape model. The neighbor three-dimensional information is, for example, a plane, a curved surface represented by a B-spline, implicit polynomials, or the like, or a distance field serving as a voxel that stores a value corresponding to a distance from a surface. A three-dimensional point with a normal may be regarded and used as a local plane. The neighbor three-dimensional information suffices to represent a three-dimensional surface.

The neighbor three-dimensional information may be calculated by performing plane fitting on a three-dimensional point group sampled from a referential three-dimensional shape model. A local plane near a two-dimensional geometrical feature may be extracted from meshes constituting a referential three-dimensional shape model, a divided plane obtained by region division of a referential three-dimensional shape model, or the like, and a plane most similar to the local plane of the neighbor in the orientation of the normal may be selected as neighbor three-dimensional information. Similarly, the neighbor three-dimensional information may be a plane obtained by calculating, for example, the average, weighted average, or median of the parameter of a local plane near a two-dimensional geometrical feature.

A three-dimensional point closest to the center of a region where a three-dimensional point group for calculating neighbor three-dimensional information is sampled, and the normal of the three-dimensional point may be regarded as a local plane and obtained as neighbor three-dimensional information. A three-dimensional point having a large number of other three-dimensional points at which a distance from a plane defined by a three-dimensional point and its normal is equal to or smaller than a threshold may be obtained as neighbor three-dimensional information from a plurality of three-dimensional points with normals within a sampling range. Further, a two-dimensional image may be referred to in addition to a three-dimensional point group, and the parameters of neighbor three-dimensional information may be obtained using a technique described in literature 7 or the like.

Literature 7: Mostafa, G.-H. Mostafa, Sameh M. Yamany, Aly A. Farag, "Integrating shape from shading and range data using neural networks", Computer Vision and Image Processing Lab, IEEE Computer Society Conference on, Vol. 2, 1999

A sampling region for calculating neighbor three-dimensional information may be not circular but rectangular or elliptical. The sampling direction may be not a direction orthogonal to the direction of a three-dimensional edge sampling point, but a direction orthogonal to the direction of a two-dimensional edge sampling point. A region such as a circular region when viewed from a direction facing the normal of neighbor three-dimensional information obtained once may be sampled.

The method of determining a sampling region is not limited to the method of expanding the region, but may be sampling of a region of a predetermined size, or a method of reducing a region of a predetermined size until the error of plane fitting becomes equal to or smaller than a threshold. As the criterion for determining completion of region expansion or region reduction, a method of determining whether plane fitting is successful, such as the error of plane fitting or its variance value, or a variance ratio before and after a change of the region, may be used. Furthermore, the sampling region may be determined by referring to a normal map obtained by projecting the normal of a referential three-dimensional shape model to a two-dimensional image, a two-dimensional image, or the like. For example, another two-dimensional edge sampling point may be searched for in a direction orthogonal to a two-dimensional edge sampling point, a region up to the position where the other two-dimensional edge sampling point has been detected may be regarded as a continuous surface region, and sampling may be performed.

The geometrical information calculation unit 160 suffices to be able to calculate three-dimensional geometrical information of a two-dimensional geometrical feature based on the position of the two-dimensional geometrical feature, external parameters, and neighbor three-dimensional information representing surface information near the two-dimensional geometrical feature. The three-dimensional geometrical information includes parameters such as the position and orientation of a three-dimensional shape equivalent to a two-dimensional geometrical feature. For example, the three-dimensional geometrical information suffices to be three-dimensional coordinates, or if a two-dimensional geometrical feature is information having an orientation, such as an edge, a combination of three-dimensional coordinates and a three-dimensional orientation. If a two-dimensional geometrical feature is an image feature on the surface, the three-dimensional geometrical information suffices to be a combination of three-dimensional coordinates and the orientation of the normal. Further, a radius representing a local circular shape, or the length of the side of a rectangle may be added to the three-dimensional geometrical information. The parameter is arbitrary as long as it represents a local three-dimensional geometrical shape.

When pieces of three-dimensional geometrical information are calculated for one two-dimensional geometrical feature, one of them may be selected based on the error of plane fitting, as in step S107, or all the pieces of three-dimensional geometrical information or pieces of three-dimensional geometrical information satisfying a criterion may be selected. The selection criterion is not limited to the error of plane fitting, and suffices to be a selection criterion capable of selecting higher-accuracy three-dimensional geometrical information.

When a plurality of two-dimensional images are captured from different viewpoints, a two-dimensional geometrical feature corresponding to calculated three-dimensional geometrical information can be searched from a two-dimensional image captured from a viewpoint different from that of a two-dimensional image used to calculate the three-dimensional geometrical information, and three-dimensional geometrical information having a smallest re-projection error can be selected. The re-projection error is a distance between coordinates at which the three-dimensional coordinates of three-dimensional geometrical information are projected on a two-dimensional image based on the external parameters of the two-dimensional image, and the coordinates of the detected two-dimensional geometrical feature. Selection of three-dimensional geometrical information is not performed when a two-dimensional geometrical feature corresponding to three-dimensional geometrical information cannot be searched from a two-dimensional image captured from a different viewpoint, or the re-projection error is larger than a predetermined threshold.

Second Embodiment

An information processing apparatus and information processing method according to the second embodiment of the present invention will be explained below. In the second embodiment, the same reference numerals as those in the first embodiment denote the same parts, and a detailed description thereof will be omitted in some cases.

[Outline]

In the first embodiment, a method of extracting a two-dimensional geometrical feature from a two-dimensional image and calculating three-dimensional geometrical information to generate a high-accuracy three-dimensional shape model has been explained. In the second embodiment, a method of correcting the three-dimensional shape model (referential three-dimensional shape model) of a target object by using a two-dimensional image obtained by capturing the target object, in other words, a method of correcting three-dimensional geometrical information extracted from a referential three-dimensional shape model to generate a high-accuracy three-dimensional shape model will be explained. In the second embodiment, a case will be explained, in which the referential three-dimensional shape model is a mesh model serving as a set of pieces of connection information between a three-dimensional point group and three-dimensional points representing a local plane.

A three-dimensional geometrical feature is a graphical feature included in the image capturing region of a target object contained in a range image, three-dimensional point group, or three-dimensional shape model, and is a three-dimensional feature such as a three-dimensional edge, corner, curvature, or normal distribution. The reproduction accuracy of the shape of the three-dimensional shape model of a target object can be improved.

Figure 5:
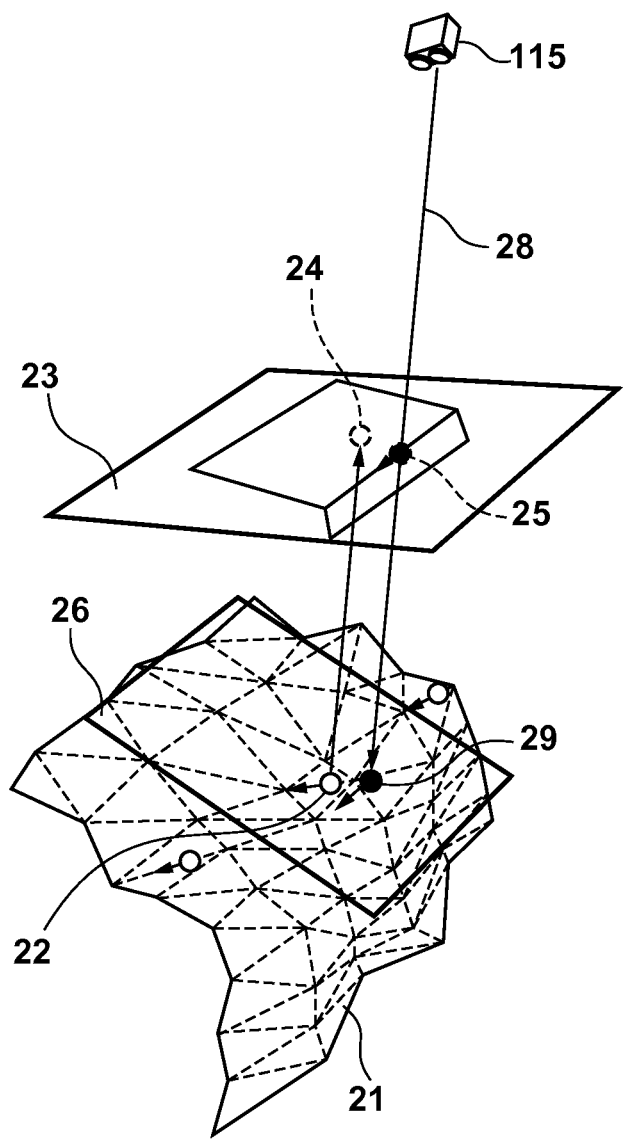
FIG. 5 is a view for explaining an outline of three-dimensional shape model correction processing according to the second embodiment.

An outline of three-dimensional shape model correction processing according to the second embodiment will be explained with reference to FIG. 5. FIG. 5 is an enlarged view showing the edge portion of a target object. An example will be explained, in which the position and orientation of a three-dimensional edge sampling point 22 that is extracted from the edge of a referential three-dimensional shape model 21 of a target object and has a three-dimensional position and direction are corrected.

As described above, the referential three-dimensional shape model 21 generated using measurement data by a three-dimensional measurement apparatus of a non-contact method can reproduce a wide surface portion with high accuracy. However, three-dimensional measurement of an edge portion is difficult, so the accuracy of the edge portion readily decreases. When a three-dimensional point on the edge and the three-dimensional edge sampling point 22 indicating the orientation are extracted from the edge portion of the referential three-dimensional shape model 21, a large error is included.

Since a visual luminance change is large at the edge portion, a two-dimensional edge sampling point 25 can be detected from a two-dimensional image 23 with high accuracy. The edge portion is a boundary between adjacent surfaces. Thus, the two-dimensional edge sampling point 25 corresponding to the three-dimensional edge sampling point 22 is searched from the two-dimensional image 23. Then, a correction point 29 on a surface (a neighbor surface 26) close to the three-dimensional edge sampling point 22 and corresponding to the two-dimensional edge sampling point 25 is searched for, and the position and orientation of the three-dimensional edge sampling point 22 are corrected based on the correction point 29.

More specifically, the two-dimensional edge sampling point 25 near a projection point 24 obtained by projecting the three-dimensional edge sampling point 22 on the two-dimensional image 23 based on the external parameters of the two-dimensional image 23 is searched for. An intersection at which a straight line (a line 28 of sight) connecting the detected two-dimensional edge sampling point 25 and the capturing viewpoint (position of an image capturing device 115) of the two-dimensional image 23 crosses the neighbor surface 26 of the three-dimensional edge sampling point 22 is calculated as the correction point 29 of the three-dimensional edge sampling point 22. The direction of the correction point 29 is calculated as an orientation that is orthogonal to the normal direction of the neighbor surface 26 and parallel to the orientation of the corresponding two-dimensional edge sampling point 25.

[Apparatus Arrangement]

Figure 6:
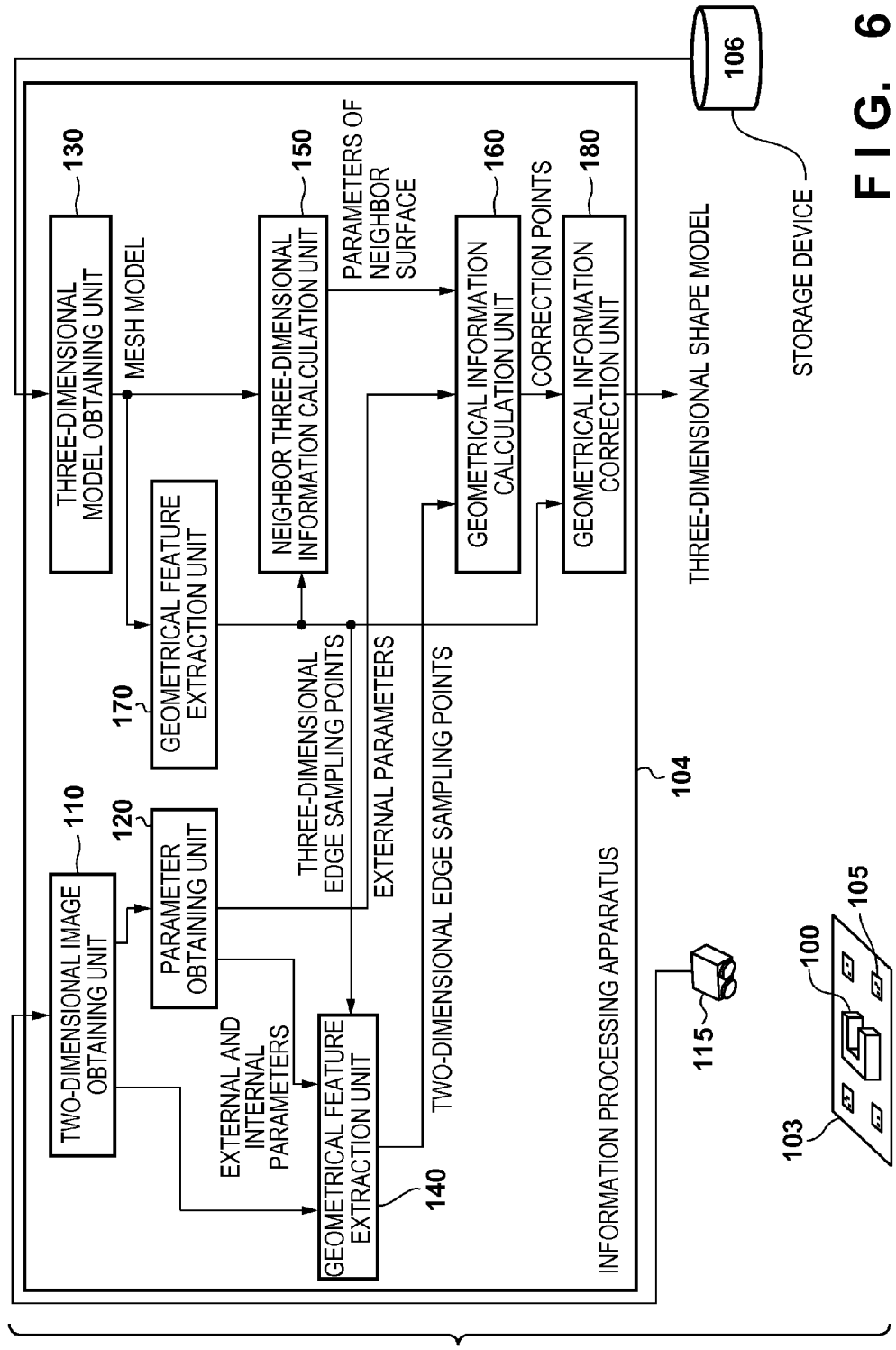
FIG. 6 is a block diagram showing the arrangement of an information processing apparatus.

The arrangement of an information processing apparatus 104 according to the second embodiment will be shown in the block diagram of FIG. 6. In addition to the arrangement shown in FIG. 3, the information processing apparatus 104 according to the second embodiment includes a geometrical feature extraction unit 170 that extracts a three-dimensional geometrical feature, and a geometrical information correction unit 180 that corrects a three-dimensional geometrical feature. Note that processes in a two-dimensional image obtaining unit 110, a parameter obtaining unit 120, and a three-dimensional model obtaining unit 130 are the same as those in the first embodiment. The three-dimensional model obtaining unit 130 according to the second embodiment reads out, as the referential three-dimensional shape model 21 of a target object 100 from a storage device 106, a mesh model serving as a set of pieces of connection information between a three-dimensional point group and three-dimensional points representing a local plane.

The geometrical feature extraction unit 170 extracts, as the three-dimensional geometrical feature of the target object 100, the three-dimensional edge sampling point 22 from the contours of the target object 100 represented by the referential three-dimensional shape model 21. The geometrical feature extraction unit 140 extracts the two-dimensional edge sampling point 25 from the two-dimensional image 23 as a two-dimensional geometrical feature corresponding to the three-dimensional edge sampling point 22 extracted by the geometrical feature extraction unit 170.

A neighbor three-dimensional information calculation unit 150 calculates, as neighbor three-dimensional information, the parameters of the neighbor surface 26 of the three-dimensional edge sampling point 22 extracted by the geometrical feature extraction unit 170 from the referential three-dimensional shape model 21. The parameters of the neighbor surface 26 indicate the parameters of a plane equation, that is, the normal of a plane and a distance from the origin, as in the first embodiment. The parameters of the neighbor surface 26 are calculated by the same method as that in the first embodiment by sampling a three-dimensional point from the surface of the referential three-dimensional shape model 21.

A geometrical information calculation unit 160 calculates three-dimensional information (position and direction) of the correction point 29 corresponding to the three-dimensional edge sampling point 22 from the external parameters, the two-dimensional information (coordinates and orientation) of the two-dimensional edge sampling point, and the parameters of the neighbor surface 26. The direction of the correction point 29 is an orientation that is orthogonal to the normal direction of the neighbor surface 26 and parallel to the orientation of the corresponding two-dimensional edge sampling point 25. The geometrical information correction unit 180 corrects three-dimensional information of the three-dimensional edge sampling point 22 based on three-dimensional information of the correction point 29.

[Correction of Three-Dimensional Shape Model]

Figure 7:
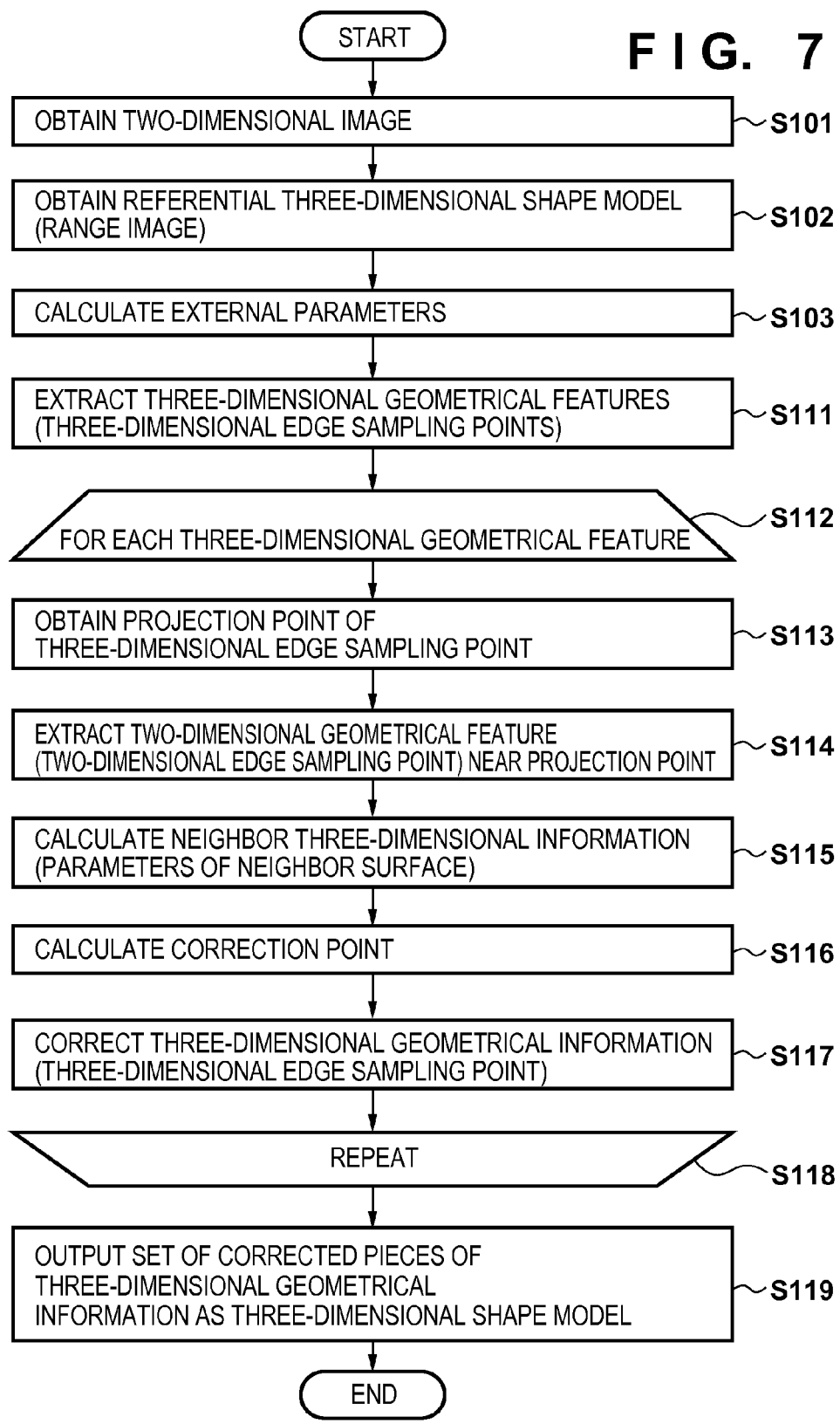
FIG. 7 is a flowchart for explaining three-dimensional shape model correction processing by the information processing apparatus.

Three-dimensional shape model correction processing by the information processing apparatus 104 according to the second embodiment will be explained with reference to the flowchart of FIG. 7. As in the first embodiment, obtainment (S101) of the two-dimensional image 23, obtainment (S102) of the referential three-dimensional shape model 21 of the target object 100, and calculation (S103) of external parameters are performed. However, the second embodiment is different from the first embodiment in that the three-dimensional model obtaining unit 130 obtains a mesh model as the referential three-dimensional shape model 21 from the storage device 106.

Then, the geometrical feature extraction unit 170 extracts the three-dimensional edge sampling points 22 as three-dimensional geometrical features from the referential three-dimensional shape model (mesh model) 21 (S111). The geometrical feature extraction unit 170 extracts, as the three-dimensional edge sampling point 22 at a sampling interval d, the coordinates of a three-dimensional point on the contour of the referential three-dimensional shape model 21 and the three-dimensional direction of a contour at the coordinates. The sampling interval d is determined by:

$$d = g/f \qquad (8)$$

where g is the average distance from the image capturing device 115 to the target object 100, and f is the focal length (internal parameter).

The sampling interval d determined by equation (8) is equivalent to the length of one pixel on the two-dimensional image 23. As the contour, a side on which the orientation of a surface in contact with the side greatly changes, that is, a side on which the angle defined by surfaces adjacent to the side is smaller than a predetermined angle θ is extracted from the sides of meshes (local planes) constituting the referential three-dimensional shape model 21. Note that the predetermined angle θ is, for example, 120°.

Subsequently, in steps S112 to S118, processes are executed for each three-dimensional edge sampling point 22 extracted as a three-dimensional geometrical feature. Although processing on one three-dimensional edge sampling point 22 will be explained below, the same processing is performed on the remaining three-dimensional edge sampling points 22.

The geometrical feature extraction unit 140 obtains the projection point 24 by projecting, on the two-dimensional image 23, the three-dimensional edge sampling point 22 extracted by the geometrical feature extraction unit 170 (S113). The geometrical feature extraction unit 140 extracts the two-dimensional edge sampling point 25 as a two-dimensional geometrical feature from the edge portion of the target object 100 captured in the two-dimensional image 23 near the projection point 24 (S114). More specifically, a Canny operator is applied to the two-dimensional image 23 to generate an edge detection image, the three-dimensional edge sampling point 22 is projected to the edge detection image by using the external and internal parameters, and the two-dimensional coordinates of the projection point 24 are calculated. Then, the coordinates (two-dimensional vector) and orientation (two-dimensional vector) of the two-dimensional edge sampling point 25 closest to the projection point 24 are obtained by nearest neighbor search.

As in step S106 according to the first embodiment, calculation of neighbor three-dimensional information (parameters of the neighbor surface 26) by the neighbor three-dimensional information calculation unit 150 is performed (S115). If the shape of the referential three-dimensional shape model 21 completely coincides with the shape of the target object 100, a mesh in contact with the three-dimensional edge sampling point 22 is set as the neighbor surface 26. A surface of a small curvature for which three-dimensional measurement can be performed stably can constitute a mesh with high accuracy, but the measurement accuracy of an edge portion is low. For this reason, it is often the case that the position and normal of a mesh in contact with the three-dimensional edge sampling point 22 are different from the shape of the target object 100.

Thus, three-dimensional points are sampled not only from the mesh in contact with the three-dimensional edge sampling point 22, but also from meshes around this mesh. Plane fitting is performed on the sampled three-dimensional point group, and the parameters of the neighbor surface 26 are calculated. More specifically, a range image is generated by projecting the mesh model to the two-dimensional image using the external and internal parameters, and sampling of the three-dimensional point group and plane fitting are performed by the same method as that in the first embodiment. Note that a center coordinate point c of the sampling region is calculated by:

$$c = p \pm r(p \times \vec{d}) \qquad (9)$$

where p is the three-dimensional coordinate point of the three-dimensional edge sampling point 22, $\vec{d}$ is the direction vector of the three-dimensional edge sampling point 22, and r is the radius of the circular region.

Thereafter, the geometrical information calculation unit 160 calculates three-dimensional information (position and direction) of the correction point 29 from the external parameters, the two-dimensional information (coordinates and orientation) of the two-dimensional edge sampling point 25, and the parameters of the neighbor surface 26 of the three-dimensional edge sampling point 22 (S116).

The geometrical information correction unit 180 corrects three-dimensional information of the three-dimensional edge sampling point 22 based on three-dimensional information of the correction point 29 (S117). As in the first embodiment, if there is no hide, a plurality of neighbor surfaces 26 are calculated and a plurality of correction points 29 are calculated. The geometrical information correction unit 180 selects a correction point 29 having a small correction amount, that is, a small distance between the correction point 29 and the three-dimensional edge sampling point 22, and uses it for correction of the three-dimensional edge sampling point 22.

It is then determined whether correction processing on all the extracted three-dimensional edge sampling points 22 has ended (S118). If the correction processing has ended, a set of the corrected three-dimensional edge sampling points 22 is output as a three-dimensional shape model (S119), and the three-dimensional shape model correction processing ends.

In this way, the three-dimensional geometrical feature of a three-dimensional shape model is corrected to improve the accuracy of a poor-accuracy three-dimensional shape model, thereby obtaining a three-dimensional shape model with high shape reproduction accuracy.

Modification of Embodiment

The geometrical feature extraction unit 170 suffices to extract a three-dimensional geometrical feature from a referential three-dimensional shape model, and may extract, as a three-dimensional geometrical feature, a characteristic three-dimensional point such as a three-dimensional edge sampling point extracted from the contour of the referential three-dimensional shape model or the corner of the referential three-dimensional shape model. The structure of the referential three-dimensional shape model may be analyzed to extract a characteristic portion (portion at which the position of a three-dimensional point, the normal, the curvature, or the like greatly changes). A three-dimensional feature detector such as Spin Images (see literature 8) may be applied to the referential three-dimensional shape model to extract a three-dimensional geometrical feature. It is also possible to create a simulation image by observing the referential three-dimensional shape model from various directions, and extract, from the simulation image, a surface point of the referential three-dimensional shape model or a point on the contour that is projected at a position where a two-dimensional geometrical feature is detected.

Literature 8: A. E. Johnson, M. Hebert, "Using Spin Images for Efficient Object Recognition in Cluttered 3D Scenes", IEEE Trans. on PAMI, Vol. 21, No. 5, pp. 433-449, 1999

After the processing in step S118, a corrected three-dimensional geometrical feature may be reflected in a referential three-dimensional shape model to reconstruct a three-dimensional shape model. For example, if the referential three-dimensional shape model is a three-dimensional shape model having surface information such as a mesh model, the three-dimensional coordinates of the corrected three-dimensional geometrical information are added as a three-dimensional point to the referential three-dimensional shape model to reconstruct the surface information. If the referential three-dimensional shape model is a range image (three-dimensional point group), the three-dimensional coordinates of the corrected three-dimensional geometrical information are added as a three-dimensional point.

It is also possible to set the reconstructed three-dimensional shape model as a referential three-dimensional shape model and repetitively perform the above-described processes (steps S112 to S118). To correct three-dimensional geometrical information based on the high-accuracy three-dimensional shape model, the reproduction accuracy of the three-dimensional shape of the target object 100 can be further improved.

Third Embodiment

An information processing apparatus and information processing method according to the third embodiment of the present invention will be explained below. In the third embodiment, the same reference numerals as those in the first and second embodiments denote the same parts, and a detailed description thereof will be omitted in some cases.

[Outline]

In the first and second embodiments, a method of creating a high-accuracy three-dimensional shape model has been explained. In the third embodiment, a method of estimating the position and orientation of a target object by using a high-accuracy three-dimensional shape model will be explained. This method can reduce the shape difference between an actual object and a three-dimensional shape model used for estimation of the position and orientation, and can calculate the position and orientation of the target object with high accuracy.

[Apparatus Arrangement]

Figure 8:
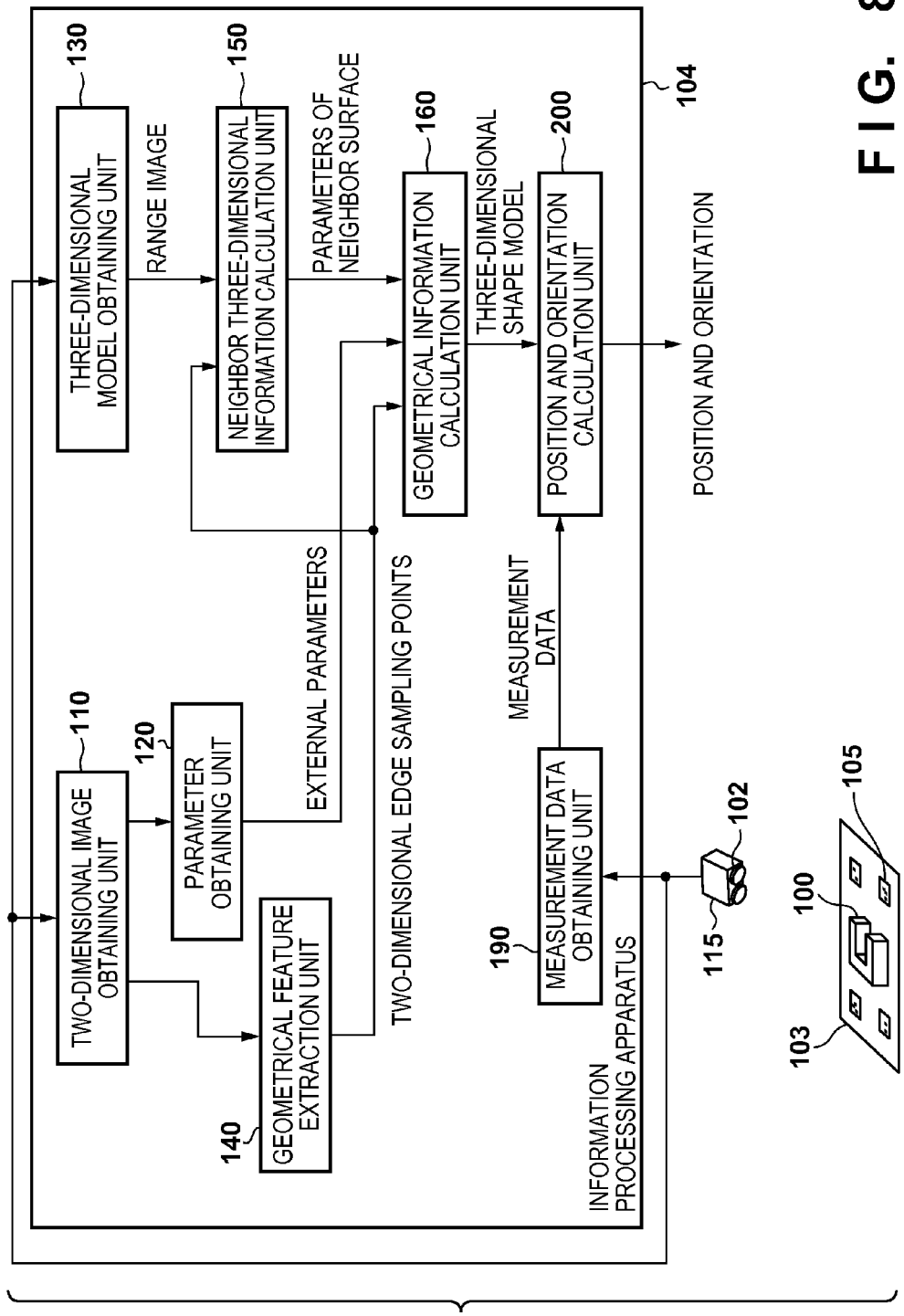
FIG. 8 is a block diagram showing the arrangement of an information processing apparatus according to the third embodiment.

The arrangement of an information processing apparatus 104 according to the third embodiment will be shown in the block diagram of FIG. 8. In addition to the arrangement shown in FIG. 3, the information processing apparatus 104 according to the third embodiment includes a measurement data obtaining unit 190 and a position and orientation calculation unit 200. More specifically, the information processing apparatus 104 according to the third embodiment calculates the position and orientation of a target object 100 by applying calculated three-dimensional geometrical information of the target object 100 to measurement data obtained by measuring a scene including the target object 100. Note that the target object 100 serving as the position and orientation calculation target need not be the same object as an actual object, and may be a different object having the same shape.

Processes in a two-dimensional image obtaining unit 110, a parameter obtaining unit 120, a three-dimensional model obtaining unit 130, a geometrical feature extraction unit 140, a neighbor three-dimensional information calculation unit 150, and a geometrical information calculation unit 160 are the same as those in the first embodiment. The measurement data obtaining unit 190 obtains the two-dimensional image of the scene including the target object 100 captured by an image capturing device 115. The two-dimensional image is a grayscale image in which a luminance value is stored in each pixel. The position and orientation calculation unit 200 calculates the position and orientation of the target object 100 by applying three-dimensional geometrical information calculated by the geometrical information calculation unit 160 to measurement data obtained by the measurement data obtaining unit 190. Note that the position and orientation may be calculated using a technique described in literature 9 or the like.

Literature 9: T. W. Drummond, R. Cipolla, "Real-time tracking of complex structures within on-line camera calibration", Proc. The 10th British Machine Vision Conference (BMVC '99), Nottingham, UK, September 1999

By using the high-accuracy three-dimensional shape model, the position and orientation of the target object can be calculated with high accuracy.

Modification of Embodiment

In the third embodiment, an example has been explained, in which the measurement data obtaining unit 190 and the position and orientation calculation unit 200 are added to the arrangement according to the first embodiment. However, an arrangement is also possible, in which the measurement data obtaining unit 190 and the position and orientation calculation unit 200 are added to the arrangement according to the second embodiment. More specifically, the position and orientation of the target object 100 may be calculated by applying, to measurement data obtained by measuring a scene including the target object 100, the three-dimensional shape model of the target object 100 corrected in the information processing apparatus 104 according to the second embodiment.

The arrangement of the measurement data obtaining unit 190 is arbitrary as long as a scene including the target object 100 can be obtained. As measurement data, a grayscale image may be obtained, or a color image using color filters of three colors may be obtained. Measurement data may be obtained using an infrared or ultraviolet ray other than visible light, or fluorescence or the like may be observed. Note that the format and size of measurement data can be set in accordance with the measurement system, and the measurement data supply source is not limited to the image capturing device, and measurement data obtained in advance may be read out from a storage device. As a matter of course, the measurement data obtaining unit 190 may use not the same image capturing device 115 as that of the two-dimensional image obtaining unit 110, but another image capturing device.

The arrangement of the position and orientation calculation unit 200 is arbitrary as long as the position and orientation of the target object 100 can be calculated from a three-dimensional shape model calculated by the geometrical information calculation unit 160, and measurement data. A method described in the following literature 10 in which three-dimensional geometrical information is applied to a two-dimensional image and a range image may be used. Alternatively, the position and orientation of the target object 100 may be calculated by applying three-dimensional geometrical information to a range image using the method described in literature 5. Alternatively, a method described in literature 11 may be used, in which the position and orientation of the target object 100 are calculated by applying a three-dimensional edge sampling point calculated by the geometrical information calculation unit 160 to the edge of the three-dimensional occluding contour of the target object 100 measured by a three lens camera.

Literature 10: Keisuke Tateno, Daisuke Kotake, Shinji Uchiyama, "A Model Fitting Method Using Intensity and Range Images for Bin-Picking Applications", IEICE Transactions on Information and Systems, Vol. J94-D, No. 8, pp. 1410-1422, 2011

Literature 11: Kenichi Maruyama, Yoshihiro Kawai, Fumiaki Tomita, "Model-based 3D Object Localization Using Occluding Contours", MIRU2009, pp. 1630-1637, 2009

The function of the information processing apparatus 104 can also be implemented by supplying, to a computer device through a recording medium, a program for executing processing of performing creation or correction of a three-dimensional shape model or calculation of the position and orientation according to one of the first to third embodiments.

Figure 9:
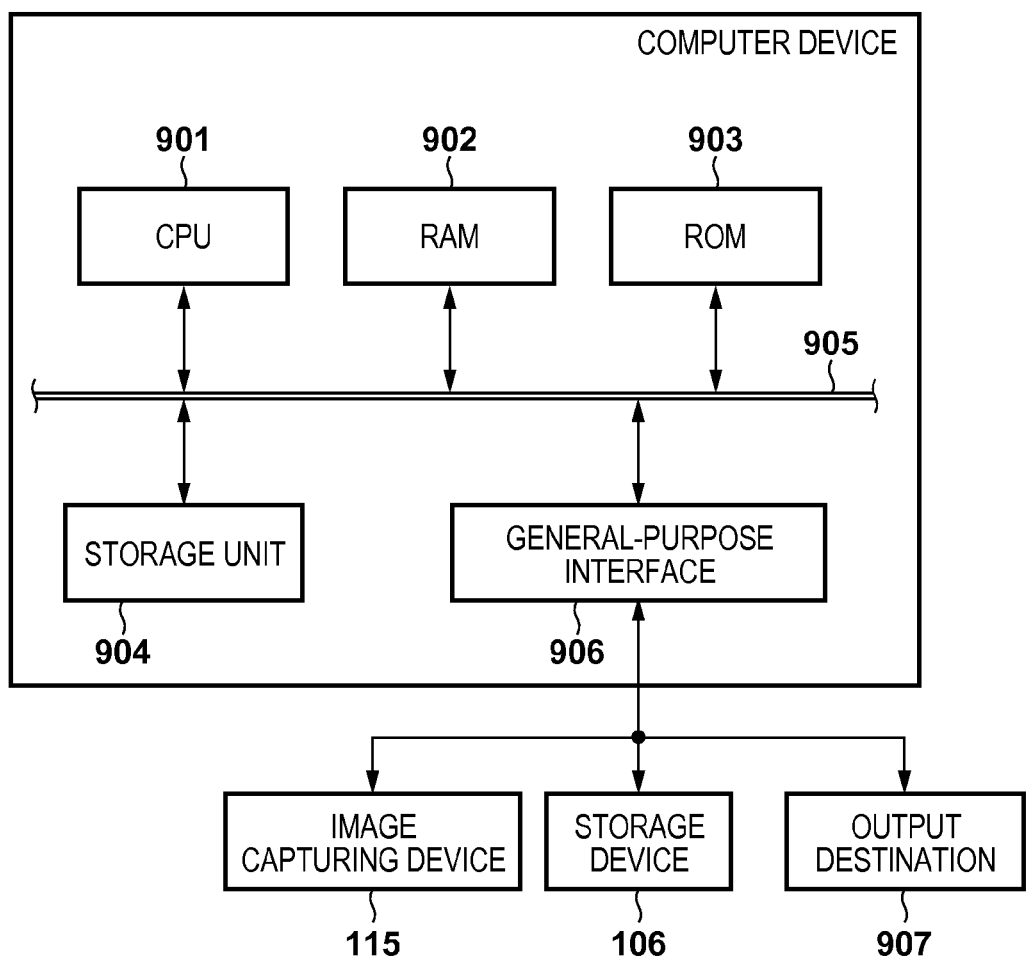
FIG. 9 is a block diagram showing the arrangement of a computer device.

FIG. 9 is a block diagram showing the arrangement of the computer device. A microprocessor (CPU) 901 controls building units (to be described below) through a system bus 905 by executing an operating system (OS) and various programs stored in a read only memory (ROM) 903 and a storage unit 904 by using a random access memory (RAM) 902 as a work memory. The storage unit 904 constituted by a hard disk drive (HDD), solid state drive (SSD), flash memory, or the like stores the program for executing processing of performing creation or correction of a three-dimensional shape model or calculation of the position and orientation according to one of the first to third embodiments. The CPU 901 loads the program to the RAM 902 and executes it, thereby executing the processing described in one of the first to third embodiments. A general-purpose interface 906 is a serial bus interface such as USB (Universal Serial Bus), and is connected to a data source (for example, the image capturing device 115 and storage device 106), and a destination 907 (for example, a display device, printing apparatus, robot apparatus, or information processing apparatus) of a three-dimensional shape model. Note that the computer device may be connected to the source and the destination through a network interface and a wired or wireless network, instead of the general-purpose interface 906.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-207541 filed Oct. 8, 2014 which is hereby incorporated by reference herein in its entirety.

What is claimed is:

1. An information processing apparatus comprising:
a processor; and
a memory storing instructions that, when executed by the processor, cause the information processing apparatus to:
obtain a two-dimensional image obtained by capturing a scene including an object;
obtain parameters indicating a capturing position and capturing orientation of the two-dimensional image;
obtain a three-dimensional shape model representing a three-dimensional shape of the object;
extract three-dimensional geometrical features of the object from the three-dimensional shape model;
extract, from the two-dimensional image, two-dimensional geometrical features corresponding to the three-dimensional geometrical features;
derive a plane representing a surface of the three-dimensional shape model at a position of each of the three-dimensional geometrical features;
correct a position and an orientation of each of the three-dimensional geometrical features based on a position and an orientation of a corresponding two-dimensional geometrical feature, the capturing position and the capturing orientation of the two-dimensional image, and the plane representing the surface at the position of the three-dimensional geometrical feature; and
output a set of the three-dimensional geometrical features in which respective positions and orientations of the three-dimensional geometrical features have been corrected, as a corrected three-dimensional shape model.

2. The apparatus according to claim 1, wherein the memory further stores instructions that, when executed by the processor, cause the information processing apparatus to extract, as the three-dimensional geometrical features, a plurality of three-dimensional sampling points representing contours of the object indicated by the three-dimensional shape model.

3. The apparatus according to claim 2, wherein the memory further stores instructions that, when executed by the processor, cause the information processing apparatus to extract, as the two-dimensional geometrical features, a plurality of two-dimensional sampling points corresponding to the plurality of three-dimensional sampling points from an edge portion of the object captured in the two-dimensional image.

4. The apparatus according to claim 3, wherein the memory further stores instructions that, when executed by the processor, cause the information processing apparatus to obtain a projection point by projecting each of the plurality of three-dimensional sampling points to the two-dimensional image, and extract a two-dimensional sampling point from the edge portion close to the projection point.

5. The apparatus according to claim 3, wherein the memory further stores instructions that, when executed by the processor, cause the information processing apparatus to:
calculate correction points in the three-dimensional shape model, corresponding to the plurality of two-dimensional sampling points based on the plurality of two-dimensional sampling points, the parameters, and the calculated three-dimensional information; and
correct the three-dimensional information of the plurality of three-dimensional sampling points corresponding to the plurality of two-dimensional sampling points based on three-dimensional information of the correction points.

6. The apparatus according to claim 5, wherein the memory further stores instructions that, when executed by the processor, cause the information processing apparatus to output a set of the plurality of three-dimensional sampling points after the correction as the three-dimensional shape model of the object.

7. The apparatus according to claim 1, wherein the memory further stores instructions that, when executed by the processor, cause the information processing apparatus to:
calculate a line which connects a position of each of the two-dimensional geometrical features and a capturing position of the two-dimensional image; and
set, as a position of each of the three-dimensional geometrical features, an intersection of the line and the surface of the object in which the three-dimensional information is calculated.

8. An information processing method comprising:
using a processor to perform:
obtaining a two-dimensional image obtained by capturing a scene including an object;
obtaining parameters indicating capturing position and capturing orientation of the two-dimensional image;
obtaining a three-dimensional shape model representing a three-dimensional shape of the object;
extracting three-dimensional geometrical features of the object from the three-dimensional shape model;
extracting, from the two-dimensional image, two-dimensional geometrical features corresponding to the three-dimensional geometrical features;
deriving a plane representing a surface of the three-dimensional shape model at a position of each of the three-dimensional geometrical features;
correcting a position and an orientation of each of the three-dimensional geometrical features based on a position and an orientation of a corresponding two-dimensional geometrical feature, the capturing position and the capturing orientation of the two-dimensional image, and the plane representing the surface at the position of the three-dimensional geometrical feature; and
outputting a set of the three-dimensional geometrical features in which respective positions and orientations of the three-dimensional geometrical features have been corrected, as a corrected three-dimensional shape model.

9. A non-transitory computer readable medium storing a computer-executable program for causing a computer to execute an information processing method, the method comprising:
obtaining a two-dimensional image obtained by capturing a scene including an object;
obtaining parameters indicating capturing position and capturing orientation of the two-dimensional image;
obtaining a three-dimensional shape model representing a three-dimensional shape of the object;
extracting three-dimensional geometrical features of the object from the three-dimensional shape model;
extracting, from the two-dimensional image, two-dimensional geometrical features corresponding to the three-dimensional geometrical features;
deriving a plane representing a surface of the three-dimensional shape model at a position of each of the three-dimensional geometrical features;
correcting a position and an orientation of each of the three-dimensional geometrical features based on a position and an orientation of a corresponding two-dimensional geometrical feature, the capturing position and the capturing orientation of the two-dimensional image, and the plane representing the surface at the position of the three-dimensional geometrical feature; and
outputting a set of the three-dimensional geometrical features in which respective positions and orientations of the three-dimensional geometrical features have been corrected, as a corrected three-dimensional shape model.

* * * * *